United States Patent
Palejiya et al.

(10) Patent No.: US 11,519,498 B2
(45) Date of Patent: Dec. 6, 2022

(54) METHODS AND SYSTEM FOR ENGINE CONTROL DURING GEAR SHIFTING IN A HYBRID ELECTRIC VEHICLE

(71) Applicant: Ford Global Technologies, LLC, Dearborn, MI (US)

(72) Inventors: Dushyant K. Palejiya, Canton, MI (US); Jason Meyer, Canton, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 16/570,904

(22) Filed: Sep. 13, 2019

(65) Prior Publication Data

US 2021/0080004 A1 Mar. 18, 2021

(51) Int. Cl.
*F16H 61/00* (2006.01)
*F16H 61/28* (2006.01)
*B60W 20/13* (2016.01)
*B60K 6/36* (2007.10)

(52) U.S. Cl.
CPC .......... *F16H 61/2807* (2013.01); *B60K 6/36* (2013.01); *B60W 20/13* (2016.01); *F16H 2061/005* (2013.01); *F16H 2061/2853* (2013.01)

(58) Field of Classification Search
CPC .......... F16H 61/2807; F16H 2061/005; F16H 2061/2853; B60W 20/13; B60K 6/36
See application file for complete search history.

(56) References Cited

U.S. PATENT DOCUMENTS

| 7,150,698 | B2 | 12/2006 | Sakamoto et al. | |
|---|---|---|---|---|
| 2009/0171523 | A1* | 7/2009 | Luo | F16D 3/66 180/65.23 |
| 2014/0342871 | A1* | 11/2014 | Isomura | B60W 30/18027 180/65.265 |
| 2016/0244043 | A1* | 8/2016 | Nefcy | B60W 10/115 |
| 2016/0264125 | A1* | 9/2016 | Kanno | B60W 10/26 |
| 2017/0225675 | A1* | 8/2017 | Wang | F16H 61/0213 |
| 2018/0118190 | A1 | 5/2018 | Ruybal et al. | |

FOREIGN PATENT DOCUMENTS

| CN | 101357633 B | * | 5/2011 | ............ B60W 20/00 |
|---|---|---|---|---|
| DE | 102007055831 A1 | * | 6/2009 | ............ B60K 6/48 |

* cited by examiner

*Primary Examiner* — Tisha D Lewis
(74) *Attorney, Agent, or Firm* — David Kelley; McCoy Russell LLP (57) ABSTRACT

Methods and systems are provided for controlling engine operation in response to a request to shift a transmission gear. In one example, a method may include maintaining operating conditions of an engine and redirecting electric power generated via the engine from a traction motor to a battery in response to a request to shift a transmission while the driveline is operating in a series mode. In this way engine efficiency may be improved and a time frame for shifting a transmission gear may be reduced responsive to a gear shift request while the powertrain is operating in series mode.

8 Claims, 6 Drawing Sheets

METHODS AND SYSTEM FOR ENGINE CONTROL DURING GEAR SHIFTING IN A HYBRID ELECTRIC VEHICLE

FIELD

The present description relates generally to methods and systems for controlling a vehicle engine to charge an onboard energy storage device during gear shift events while the vehicle is operating in series mode.

BACKGROUND/SUMMARY

A hybrid vehicle may include more than one power source and one or more energy storage devices. A goal of the hybrid vehicle is to combine several similar or dissimilar types of energy stores and/or energy converters with different drive components, and operate each power source under varying conditions in a manner that results in greater overall energy savings than may otherwise be achieved via a single power source. A first power source of a hybrid vehicle may be an engine powered via fuel, and a second power source may be an electric motor/generator powered via electrical energy. A hybrid vehicle that relies on the vehicle's first power source and second power source to both independently transmit power to the vehicle's wheels may be referred to as a parallel hybrid vehicle. Alternatively, a hybrid vehicle that relies solely on the second power source for transmitting power to the vehicle's wheels may be referred to as a series hybrid vehicle. For a series hybrid vehicle, the first power source may be used to convert energy and provide power with which to power the second power source, where the first power source is not mechanically linked to the vehicle's wheels. A hybrid vehicle that combines the operational capabilities of both the series and parallel hybrid is referred to as a series-parallel hybrid.

One example of a series-parallel hybrid may include an engine coupled to an integrated starter/generator (ISG), the engine and the ISG selectively coupled to a traction motor via a first clutch, the traction motor coupled to a transmission that includes a second clutch. The engine and the ISG may supply electric power to the traction motor while the vehicle is operating in a series mode of operation. However, engine efficiency may be reduced if engine operation is adjusted during a shift of the transmission when traction motor output is reduced to zero. More specifically, when a gear shift is requested while the vehicle is operating in series mode, the input torque to the transmission may have to be very low before the shift can be initiated. Commanding the traction motor to a low power value so as to reduce the input torque to the transmission may be equivalent to commanding a low driver demand power temporarily for the gear shift, which may force the engine outside its most efficient operating conditions in terms of an engine power command that relies on driver demand power. A related issue that arises as a result of temporarily changing the engine power command is that the actual change in the engine power may be slower compared to the actual change in driver demand power via the traction motor. If the engine power command reflects the temporary change in driver demand power, then the gear shift duration may be prolonged.

The inventors herein have recognized the above-mentioned issues, and have developed systems and methods to at least partially address them. In one example, a driveline operating method comprises maintaining operating conditions of an engine and redirecting electric power generated via the engine from a traction motor to a battery in response to a request to shift a transmission when the driveline is operating in a series mode. In this way, changes to engine operation may be avoided (or significantly reduced), which may improve engine efficiency and reduce a time frame for gear shift events.

In one example, the operating conditions may be engine speed and engine load. The transmission may be positioned in the driveline downstream of the traction motor. The request to shift the transmission may include a request to shift the transmission from a lower gear to a higher gear, and shifting the transmission may include controlling an open and a closed state of a transmission dog clutch. As one example, the method may include maintaining operating conditions when it is inferred that an entirety of the electric power being used by the traction motor can be redirected to the battery. In another example, the method may include reducing an engine load and supplying a maximum power to the battery in response to the battery having insufficient capacity to store engine output immediately before the request to shift the transmission.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
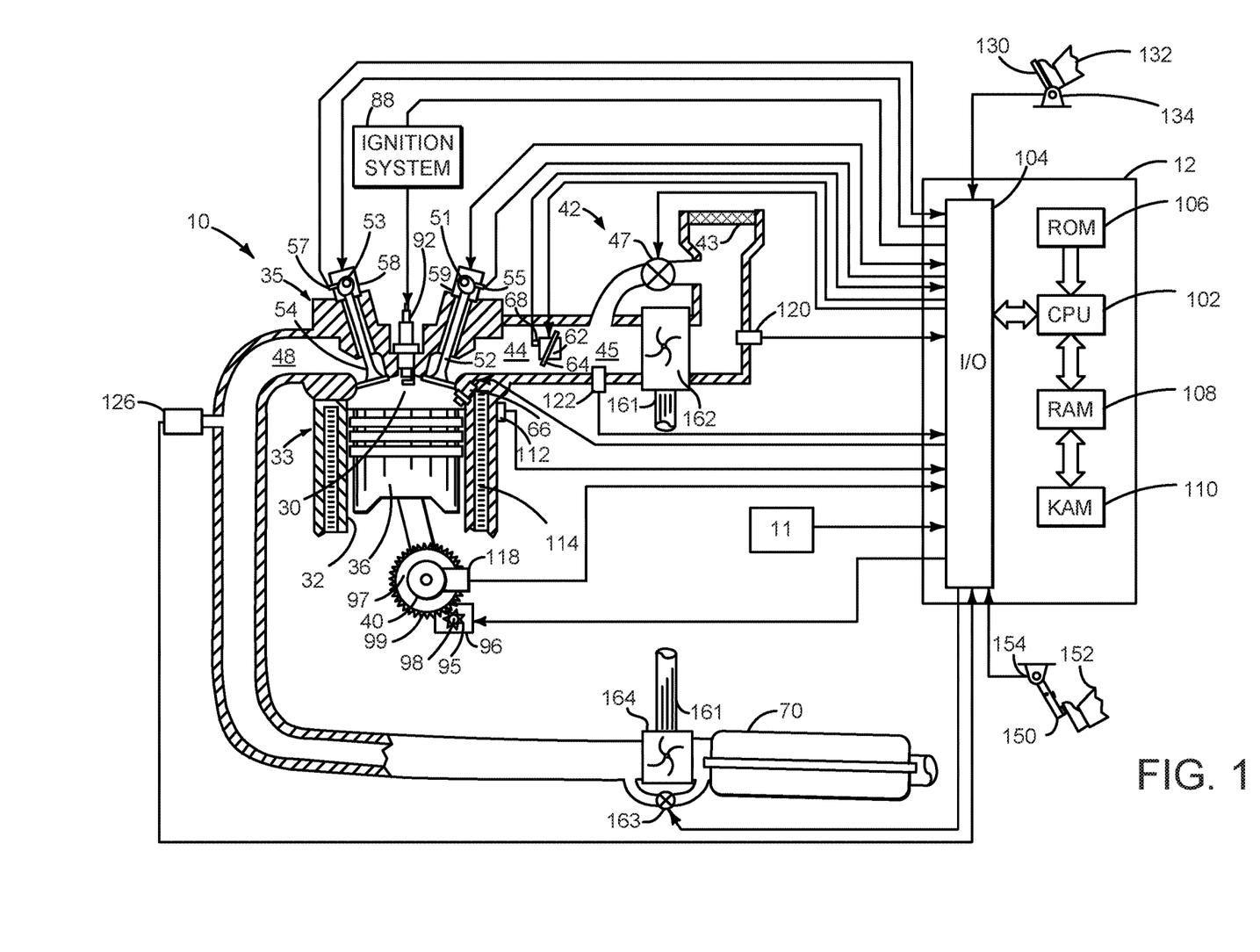
FIG. 1 is a schematic diagram of an engine.
Figure 2:
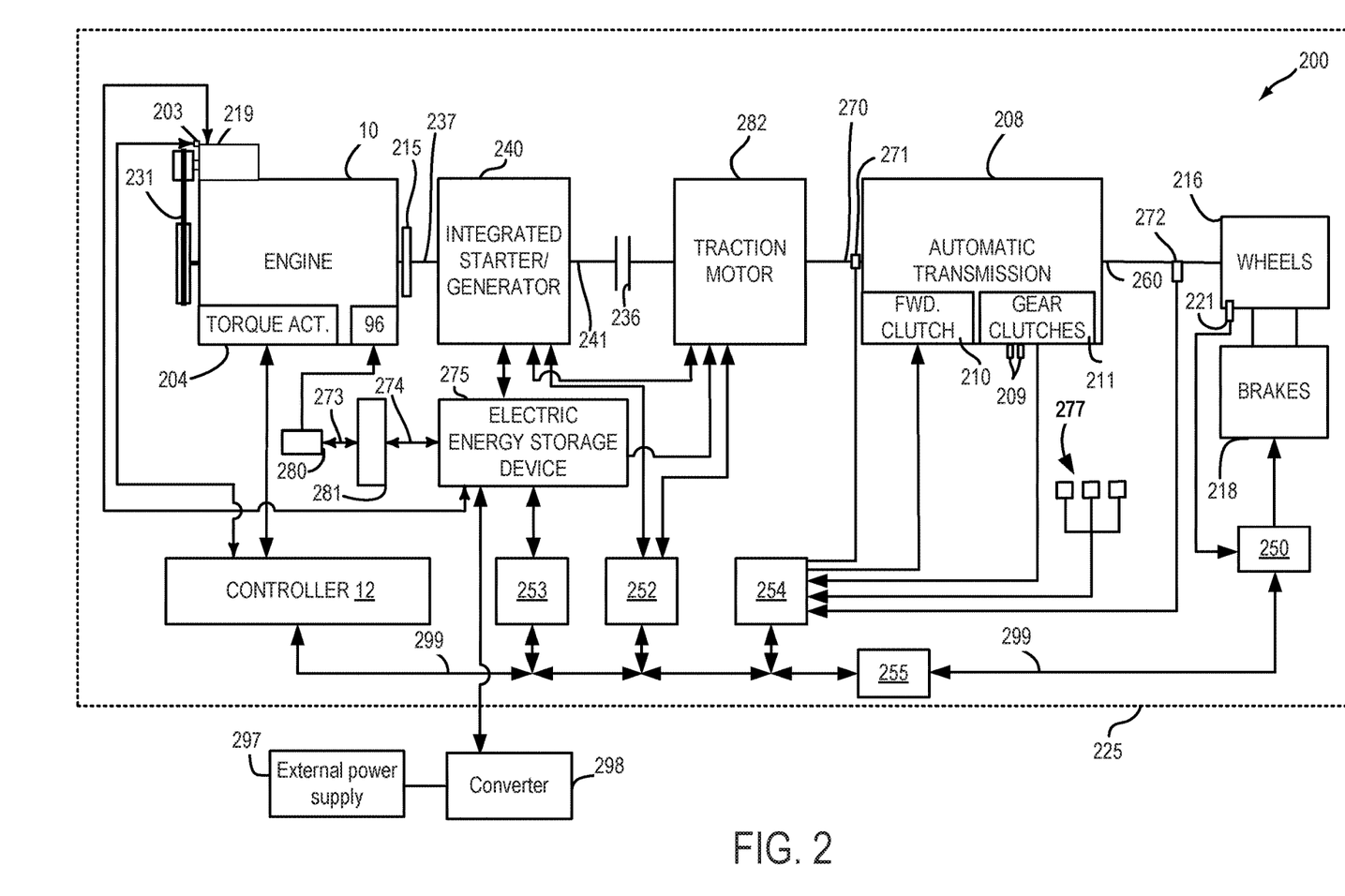
FIG. 2 is a schematic diagram of a hybrid vehicle powertrain.
Figure 3:
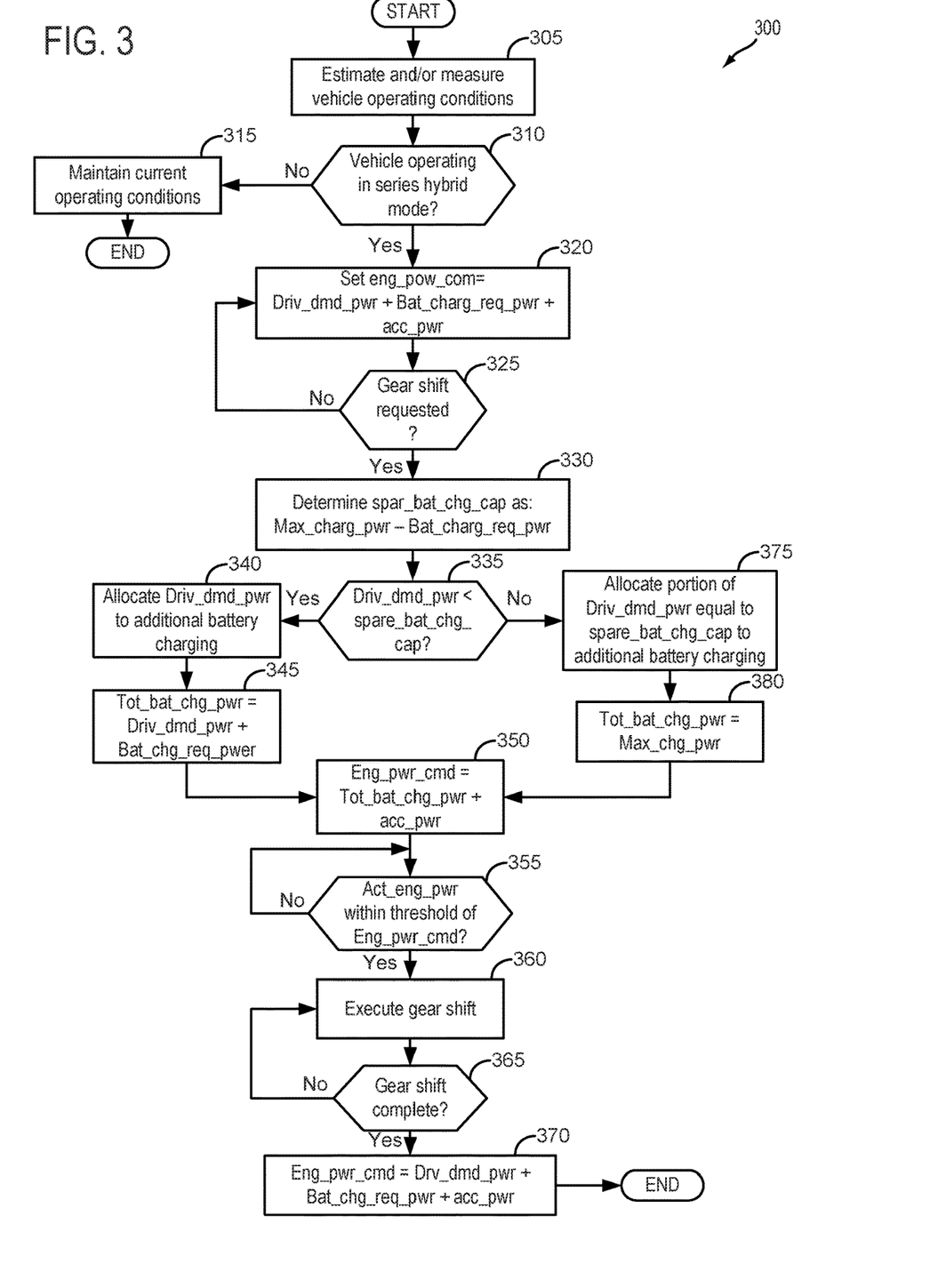
FIG. 3 describes a method for operating the engine in response to a gear shift request while the vehicle driveline is operating in a series mode of hybrid operation.
Figure 4:
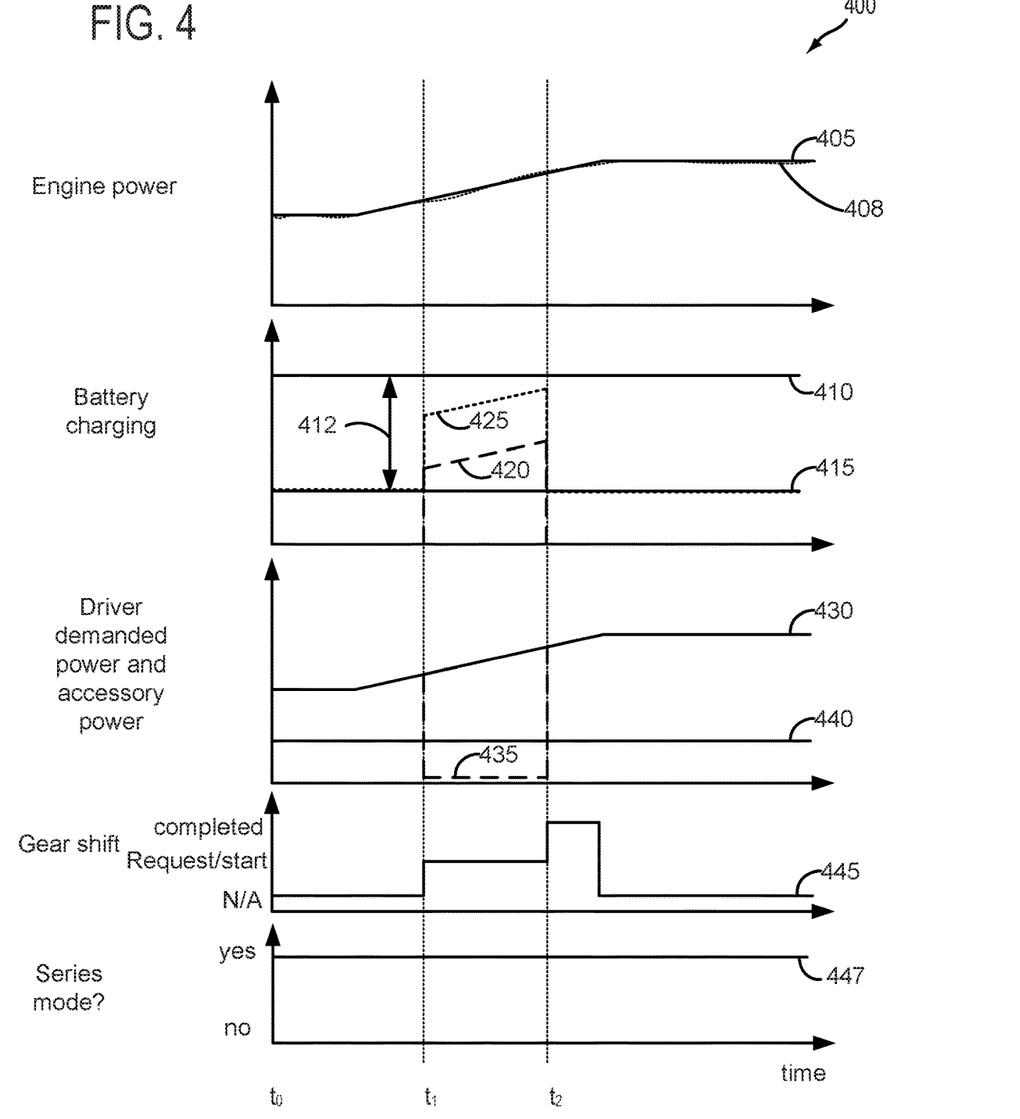
FIG. 4 depicts a prophetic example for controlling engine operation during a gear shift request with the driveline in series mode under conditions where driver demand power is less than a capacity for charging an onboard energy storage device.
Figure 5:
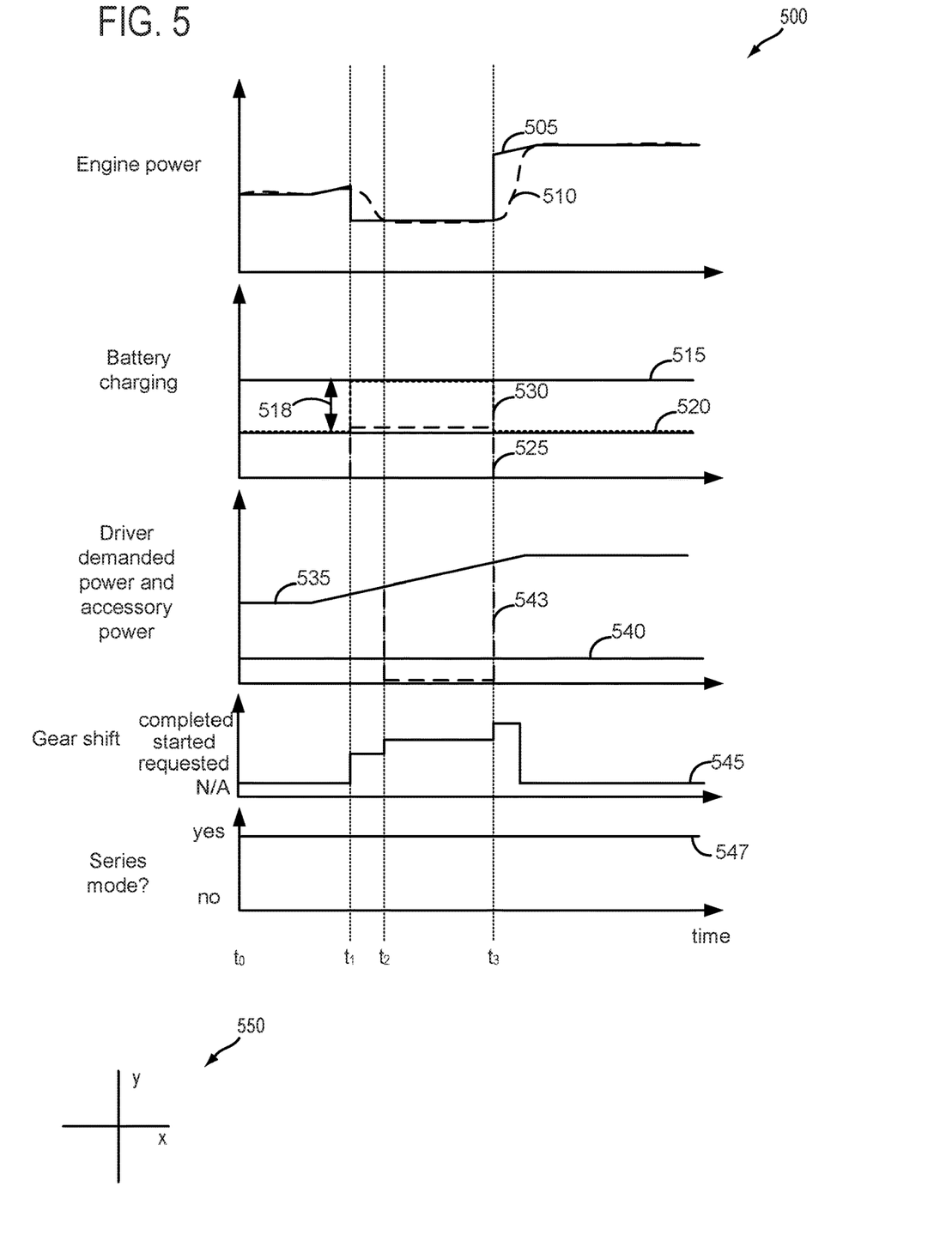
FIG. 5 depicts a prophetic example for controlling engine operation during a gear shift request with the driveline in series mode under conditions where driver demand power is greater than a capacity for charging the onboard energy storage device.
Figure 6:
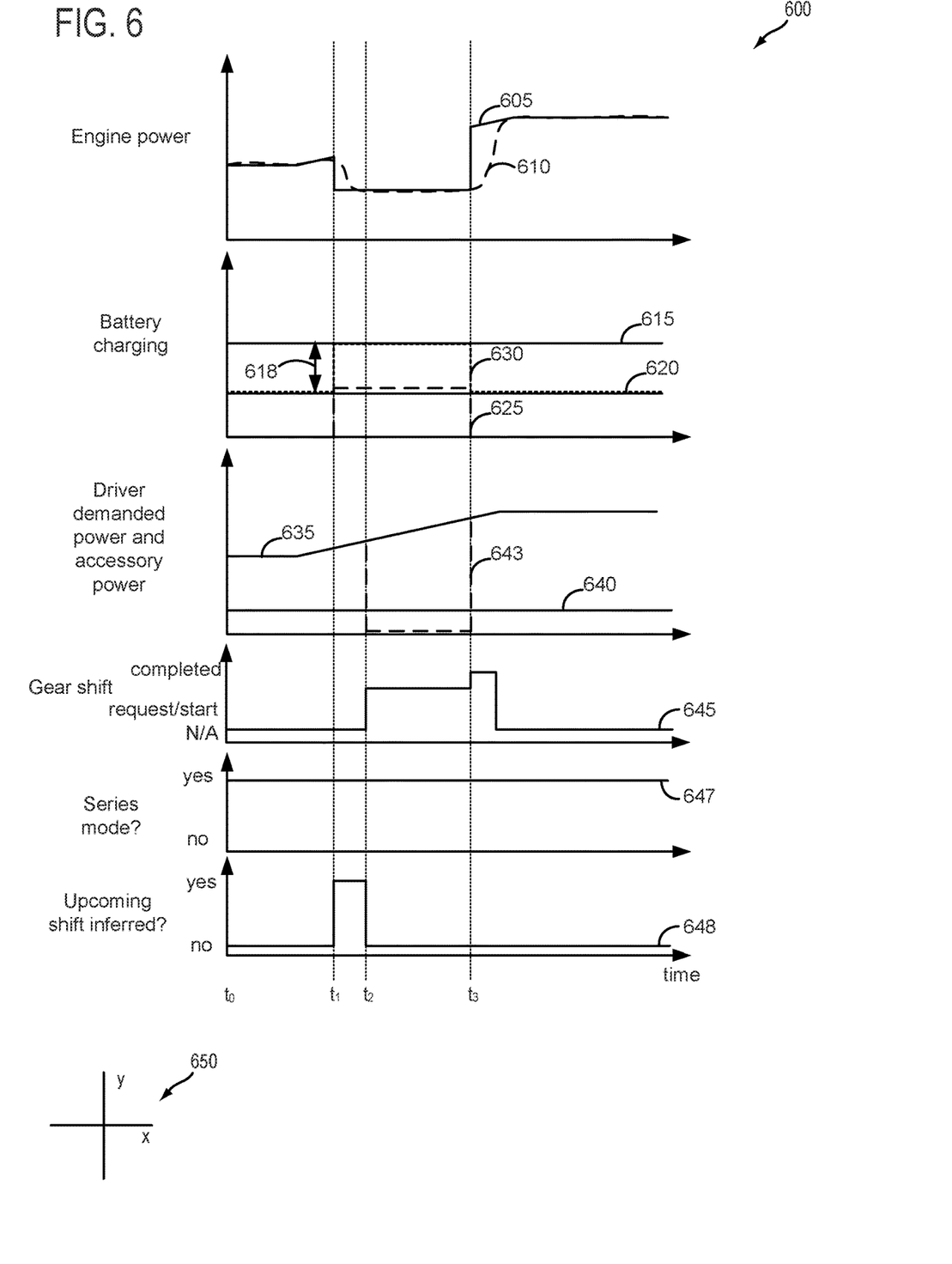
FIG. 6 depicts a prophetic example for controlling engine operation just prior to and during a gear shift request with the driveline in series mode under conditions where driver demand power is greater than a capacity for charging the onboard energy storage device.

The following description relates to systems and methods for controlling engine operation for a transmission gear shift while the vehicle powertrain is being operated in series mode. Accordingly, FIG. 1 depicts an engine system. Depicted at FIG. 2 is an example illustration of a powertrain that can be operated in series mode. FIG. 3 depicts an example methodology for controlling engine operation in response to a request to shift a transmission gear while the powertrain is in the series mode of operation. FIGS. 4-6 depict prophetic examples for controlling engine operation for gear shift events according to the method of FIG. 3.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-2 and employs the actuators shown in FIGS. 1-2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed decreasing, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by one or more of engine 10, electric machine 240, and traction motor 282. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of ISG 240 through dual mass flywheel 215 coupled to ISG input shaft 237. A disconnect clutch 236 may be positioned between ISG 240 and traction motor 282 along shaft 241. Disconnect clutch 236 may be electrically or hydraulically actuated.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. ISG 240 may provide a positive torque or a negative torque to powertrain 200 via operating as a motor or generator as instructed by electric machine controller 252.

Electric machine controller 252 may control torque output and electrical energy production from ISG 240 by adjusting current flowing to and from field and/or armature windings of ISG as is known in the art. Similarly, electric machine controller 252 may control torque output and electrical energy production from traction motor 282 by adjusting current flowing to and from field and/or armature windings of traction motor 282 as is known in the art.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages gear clutches 211, and forward clutch 210. Transmission controller also selectively deactivates or disengages gear clutches 211, and forward clutch 210.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive additional transmission information from sensors 277, which may include but are not limited to pump output line pressure sensors, transmission hydraulic pressure sensors (e.g., gear clutch fluid pressure sensors), ISG temperature sensors, traction motor temperature sensors, BISG temperature sensors, and ambient temperature sensors.

Further, a frictional force may be applied to wheels 216 by engaging friction wheel brakes 218. In one example, friction wheel brakes 218 may be engaged in response to the driver pressing his foot on a brake pedal (e.g. brake pedal 150 at FIG. 1) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque (or traction motor torque) does not cause the wheel torque limit to be exceeded. For example, if controller 250 issues a negative wheel torque limit of 50 N-m, ISG torque (or traction motor torque, depending on the current state of disconnect clutch 236) is adjusted to provide less than 50 N-m (e.g., 49 N-m) of negative torque at the wheels, including accounting for transmission gearing.

Thus, based on the above it may be understood that powertrain 200 may be operated in a parallel mode of operation where disconnect clutch 236 is commanded fully closed and wheel torque may be provided via some combination of engine torque and one or more of ISG torque and traction motor torque. In another example, powertrain 200 may be operated in a series mode of operation where disconnect clutch 236 is commanded fully open so that the engine 10 and ISG 240 are mechanically disconnected from the traction motor 282, automatic transmission 208 and wheels 216. In this series mode of operation, the ISG 240 is maintained electrically coupled to electric energy storage device 275 and traction motor 282, thus enabling engine 10 to supply power to electric energy storage device 275 and/or traction motor 282 via ISG 240.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Driver requests may be interpreted by vehicle system controller 255. Driver requests may include gear selection and accelerator pedal position to interpret the driver's intention of desired wheel torque. The driver's input to the brake pedal may be interpreted by brake controller 250 and a wheel torque modification request may be sent to vehicle system controller 255 to adjust the final wheel torque. The vehicle system controller 255 may further monitor a power request from any external loads connected to external power supply 297. For example, electric energy storage device 275 may provide a source of direct current (DC) that is converted to alternating current (AC) via DC-to-AC converter 298. The alternating current may be used to power external loads (e.g. electrical tools, machines, etc.) by electrically coupling the external loads to external power supply 297. The energy storage device controller 253 may monitor electric energy storage device temperature, voltage, current, state of charge (SOC) and may determine a maximum allowable discharge power limit and a maximum allowable charge power limit. The vehicle system controller 255 may determine a powertrain operating point to maintain battery state of charge, minimize fuel consumption, deliver the driver demanded vehicle operation and in some examples control power to the external power supply 297. A torque control feature as part of the vehicle system controller 255 may be responsible for determining a torque split between the engine and motor torque command as well as transmission gear selection.

Accordingly, torque control of the various powertrain components may be supervised by vehicle system controller 255 with local torque control for the engine 10, transmission 208, electric machine 240 and traction motor 282, and brakes 218 provided via engine controller 12, electric machine controller 252, transmission controller 254, and brake controller 250, respectively.

Thus, under conditions where powertrain 200 is being operated in the series mode with disconnect clutch 236 fully open, engine 10 may be on and producing power that is converted to electrical power via ISG 240. It may be understood that, with disconnect clutch 236 fully open, both engine 10 and ISG 240 are mechanically disconnected from the driveline and driven wheels 216. In such a circumstance, electrical power from the engine and ISG can be used for one or more purposes. As one example, the electrical power from engine 10 and ISG 240 can be used to provide the electrical power consumed by the traction motor 282 to deliver driver demanded torque. Additionally or alternatively, the electrical power from engine 10 and ISG 240 can be used to charge electric energy storage device 275. Additionally or alternatively, the electrical power from engine 10 and ISG 240 can be used to power external loads.

It may be understood that in each of the above-mentioned examples, the engine power command may be determined as a sum of driver demanded power, battery charging request power, and external accessories power, as per equation (1) below:

$$\text{engine power command} = \text{driver demand power} + \text{battery charging request power} + \text{accessories power} \quad (1)$$

It may be understood that battery charging request power may be calculated as a tradeoff between maintaining the battery's SOC within a desired range and optimizing torque delivery during transient driving conditions. While many factors may influence battery charging request power, three main factors include SOC, driver demand power and vehicle speed.

When a gear shift is requested (e.g. via a driver or via the torque control feature of the vehicle system controller), input torque to transmission 208 may have to be very low (e.g. within a threshold torque of 0 N-m) before an appropriate transmission clutch (e.g. gear clutches 211 at FIG. 2) may be actuated (e.g. opened) to initiate the shift. Controlling the traction motor to this low value may be understood to be equivalent to assigning a similarly low driver demand power (e.g. driver demand power within a threshold power of 0 watts) temporarily for the duration of the gear shift routine.

In series operation, the vehicle system controller 255 may aim to operate the engine at its most efficient conditions for the given engine power command. It may be understood that it is preferable to maintain engine operation at its most efficient conditions and to not disturb the operation for temporary changes in power demand. Because, as discussed above, a gear shift introduces a temporary reduction in driver demand power, this may potentially force engine operation outside its most efficient operational conditions according to equation (1) above, due to the engine power command being directly dependent on driver demand power.

A related issue with regard to temporarily changing the engine power command is that the actual change in the engine power may be slower compared to the actual change in driver demand power via the traction motor. Specifically, this means that if the engine power command reflected the temporary change of driver demand power, then a duration for the gear shift may be increased.

Thus, systems and methods as discussed herein provide an advantage in that the effect of gear shift-induced changes in engine operation may be minimized while staying within powertrain system constraints. A related advantage is that the systems and methods discussed herein minimize the effect of engine operation on gear shift duration, which may enable faster gear shifts.

Discussed herein, a system for a hybrid electric vehicle may include a driveline disconnect clutch positioned between an integrated starter/generator and a traction motor, the traction motor downstream of the integrated starter/generator and upstream of a transmission. The system may further include an engine positioned upstream of the integrated starter/generator. The system may further include an electrical energy storage device. The system may further include a controller with computer readable instructions stored on non-transitory memory that, when executed, cause the controller to, in response to a request to shift the transmission under conditions where the driveline disconnect clutch is fully open and where the traction motor is providing a driver demanded power to driven wheels of the vehicle via electric power generated by the engine, determine a storage capacity of the electrical energy storage device, and maintain an engine power output and transfer an electric power equivalent to the driver demanded power from the traction motor to charging the electrical energy storage device under conditions where the driver demanded power is less than the storage capacity of the electrical energy storage device.

For such a system, the controller may store further instructions to adjust the engine power output to charge the electrical energy storage device to a maximum charging power limit of the electrical energy storage device under conditions where the driver demanded power is greater than the storage capacity of the electrical energy storage device.

For such a system, the controller may store further instructions to adjust the engine power output immediately prior to the request to shift the transmission.

For such a system, the transmission may include a dog-clutch for controlling shifting of the transmission. The controller may store further instructions to control an open state and a closed state of the dog-clutch for executing the request to shift the transmission.

Turning now to FIG. 3, depicted is an example method 300 for controlling engine operation in response to a request for a transmission gear shift. Specifically, method 300 includes responsive to a request for a gear shift while the vehicle drivetrain is operating in a series mode of operation, determining a remaining or spare capacity of the electrical energy storage device (e.g. electrical energy storage device 275 at FIG. 2), determining whether driver demand power is less than or exceeds the spare capacity, and controlling engine operation to charge the electrical energy storage device as a function of whether driver demand power is less than or greater than the spare capacity. Discussed herein, the electrical energy storage device may be referred to as a battery.

Method 300 will be described with reference to the systems and components described herein and shown in FIGS. 1-2, though it will be appreciated that similar methods may be applied to other systems and components without departing from the scope of this disclosure. Instructions for carrying out method 300 and the rest of the methods included herein may be executed by a controller, such as controller 12 at FIG. 1, based on instructions stored in non-transitory memory, and in conjunction with signals received from sensors of the engine system and vehicle driveline as discussed with regard to FIGS. 1-2. The controller may employ actuators such as engine torque actuators (e.g. torque actuators 204 at FIG. 2), ISG (e.g. ISG 240 at FIG. 2), traction motor (e.g. traction motor 282 at FIG. 2), etc., to alter states of devices in the physical world according to the methods depicted below.

Method 300 begins at 305 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, air/fuel ratio, manifold air pressure, BISG torque, ISG torque, traction motor torque, battery SOC, etc., various fuel system conditions, such as fuel level, fuel type, fuel temperature, etc., as well as various ambient conditions, such as ambient temperature, humidity, barometric pressure, etc.

Proceeding to 310, method 300 includes indicating whether the powertrain is currently being operated in a series mode. Under circumstances where the disconnect clutch (e.g. disconnect clutch 236 at FIG. 2) is open and the engine is operating to charge the battery (e.g. electrical energy storage device 275 at FIG. 2) via the ISG (e.g. ISG 240 at FIG. 2) and/or to provide electrical energy to power the traction motor (e.g. traction motor 282 at FIG. 2), it may be understood that the powertrain is being operated in series mode.

If, at 310 it is indicated that the powertrain is not operating in series mode, then method 300 may proceed to 315, where current operating conditions may be maintained. For example, if the powertrain is operating in a parallel mode of operation, then such operational conditions may be maintained. Alternatively, if the vehicle is being powered solely via electrical energy, such operating conditions may be maintained. Method 300 may then end. While method 300 is depicted as ending after step 315, it may be understood that method 300 may return to the start as vehicle operation continues in order to determine when series mode is entered into.

Returning to 310, in response to an indication that the vehicle powertrain is operating in the series mode, method 300 may proceed to 320. At 320, method 300 may include setting the engine power command equal to a sum of driver demand power, battery charging requested power, and power being used to power any electrical accessories. In other words, the engine power command may be set according to equation (1) described above. Engine actuators (e.g. torque actuators 204 at FIG. 2) including but not limited to fuel injector(s), spark plug(s), intake throttle, etc., may be used via the engine controller to control the engine to meet the engine power command.

Continuing to 325, method 300 includes indicating whether a transmission gear shift is requested. A gear shift may be requested via the driver (e.g. via the gearshift or gear stick), or via the torque control feature as part of the vehicle system controller (e.g. vehicle system controller 255 at FIG. 2). In the event that a gear shift is not requested, method 300 may return to 320 where engine power is commanded according to equation (1) above, as discussed. Alternatively, in response to a gear shift being indicated to be requested at 325, method 300 may proceed to 330.

At 330, method 300 determines the battery's spare charging capacity. Determining the battery's spare charging capacity may be carried out by the vehicle system controller based on information retrieved from the battery and/or the battery controller (e.g. energy storage device controller 253 at FIG. 2). The battery's spare charging capacity may be determined as a difference between a maximum charging power limit of the battery and a currently requested battery charging power.

With the battery's spare charging capacity determined at 330, method 300 proceeds to 335. At 335, method 300 includes determining whether current driver demanded power is less than the battery's spare charging capacity. Current driver demanded power may be a function of accelerator pedal position, for example. If driver demanded power is determined to be less than the battery's spare charging capacity, then method 300 proceeds to 340. At 340, method 300 includes allocating an entirety of the driver demanded power to additional battery charging. In other words, when driver demanded power is less than the battery's spare charging capacity, all of the driver demanded power may be allocated to charge the battery. Accordingly, at 345, method 300 includes setting the total battery charging power equal to a sum of the driver demanded power and the currently requested battery charging power.

With the total battery charging power commanded to be the sum of the driver demanded power and the currently requested battery charging power, method 300 proceeds to 350. At 350, method 300 includes setting the engine power command equal to the sum of the total battery charging power and power being used via any accessory loads that are powered via the battery. It may be understood that, when step 350 follows step 345, the total battery charging power is the sum of the driver demanded power and the currently requested battery charging power, as discussed. Thus, it may be understood that when step 350 follows step 345, the sum of the driver demanded power and the currently requested battery charging power may be less than a maximum battery charging power limit.

While not explicitly illustrated, it may be understood that in setting the engine power command at 350, engine torque actuators may be controlled so as to control engine power to the engine power command. For example, a quantity and rate at which fuel is provided to the engine cylinders may be controlled in order to control engine power to the commanded engine power. Additionally or alternatively, an amount of throttle opening may be controlled in order to control engine power to the commanded engine power. Additionally or alternatively, spark timing may be controlled in order to control engine power to the commanded engine power.

Accordingly, proceeding to 355, method 300 includes indicating whether actual engine power is within a predetermined threshold of the commanded engine power from step 350. If not, then method 300 may continue to command engine actuator(s) to control engine power to the commanded engine power. Actual engine power may be determined based on an estimate of engine torque and engine speed, which may be inferred based on output from a crankshaft position sensor (e.g. Hall effect sensor 118 at FIG. 1) in conjunction with vehicle speed. In some examples, a dedicated engine torque sensor (not shown) may be included for monitoring engine torque.

In response to actual engine power being within the threshold of the commanded engine power, method 300 proceeds to 360. At 360, method 300 includes executing the gear shift. For example, if the transmission is in second gear, then executing the gear shift may include changing the engaged gear from second gear to third gear of the transmission. For executing the gear shift, it may be understood that the electric machine controller (e.g. electric machine controller 252 at FIG. 2) may command the traction motor to a torque value that is within a threshold (e.g. 1-2 N-m or less) of 0 N-m. Once the input torque to the transmission is within the threshold of 0 N-m, then a transmission dog clutch may be opened to execute the gear shift. As an example, it may be understood that basic operation of such a transmission dog clutch may include, in response to a request to shift gears of the transmission, reducing input torque to the input shaft of the transmission, moving a sliding dog clutch disc away from a fixed dog clutch disc (e.g. opening the dog clutch of the current gear), synchronizing transmission input shaft speed to output shaft speed, and moving a different dog clutch disc (e.g. desired dog clutch disc) to the fixed dog clutch disc to close the dog clutch for the desired gear.

At 365, method 300 includes judging whether the gear shift event has been completed. If not, then the process of shifting gears may continue at step 360. Alternatively, in response to the gear shift being indicated to be completed, method 300 proceeds to 370. At 370, method 300 includes once again setting the engine power command equal to the sum of the driver demanded power, the currently requested battery charging power, and any power requested for use in powering accessories. While not specifically illustrated, it may be understood that in response to the gear shift event having taken place, the traction motor may be commanded to provide torque to the driven wheels as a function of driver demand. Method 300 may then end.

Returning to 335, in an example where driver demanded power is equal to or exceeds the battery's spare charging capacity, method 300 proceeds to 375. In other words, under conditions where driver demanded power is not less than the battery's spare charging capacity, method 300 proceeds to 375. At 375, method 300 includes allocating a portion of the driver demanded power to additional battery charging (e.g. additional to the currently requested battery charging power). In other words, because the driver demanded power is not less than the battery's spare charging capacity, an entirety of the driver demanded power may not be able to be allocated to the additional battery charging. Instead, the portion of the driver demanded power that can be allocated to additional battery charging may be equal to the battery's spare charging capacity. Accordingly, at 375, method 300 includes allocating a portion of the driver demanded power equal to the battery's spare charging capacity to additional battery charging.

Thus, proceeding to 380, method 300 includes setting the total battery charging power equal to the maximum battery charging power limit. Then, proceeding to 350, method 300 includes setting the engine power command equal to the total battery charging power plus any power being requested from accessory electrical loads. Thus, it may be understood that when step 350 follows step 380, the engine power command equals the maximum charging power of the battery plus any power being requested from accessory electrical loads.

While not explicitly illustrated, it may be understood that in setting the engine power command at 350, engine torque actuators may be controlled so as to control engine power to the engine power command. For example, a quantity and rate at which fuel is provided to the engine cylinders may be controlled in order to control engine power to the commanded engine power. Additionally or alternatively, an amount of throttle opening may be controlled in order to control engine power to the commanded engine power. Additionally or alternatively, spark timing may be controlled in order to control engine power to the commanded engine power.

The rest of method 300 proceeds essentially as discussed above, and thus the remaining steps 355-370 will be briefly discussed. At 355, method 300 includes indicating whether the actual engine power is within the threshold of the engine power command. If not, then engine actuators may continue to be relied upon for controlling actual engine power to the engine power command. In response to the actual engine power being within the threshold of the engine power command, method 300 proceeds to 360, where the gear shift is executed. While not explicitly illustrated, it may be understood that to execute the gear shift the electric machine controller (e.g. electric machine controller 252 at FIG. 2) may command the traction motor to a torque value that is within a threshold (e.g. 1-2 N-m or less) of 0 N-m. In response to input torque to the transmission being within the threshold of 0 N-m, the gear shift may proceed. Specifically, the transmission dog clutch may be actuated open to execute the gear shift.

In response to the gear shift being indicated to have taken place at 365, method 300 may include once again setting the engine power command equal to the sum of the driver demanded power, the currently requested battery charging power, and any power requested for use in powering accessories. While not specifically illustrated, it may be understood that in response to the gear shift event having taken place, the traction motor may be commanded to provide torque to the driven wheels as a function of driver demand. Method 300 may then end.

Thus, discussed herein, a driveline operating method may include maintaining operating conditions of an engine and redirecting electric power generated via the engine from a traction motor to a battery in response to a request to shift a transmission when the driveline is operating in a series mode.

In such a method, the operating conditions may be an engine speed and an engine load.

In such a method, the transmission may be positioned in the driveline downstream of the traction motor.

In such a method, the request to shift the transmission may include a request to shift the transmission from a lower gear to a higher gear.

In such a method, shifting the transmission may include controlling an open and a closed state of a transmission dog clutch.

In such a method, the method may further include maintaining operating conditions in response to inferring that an entirety of the electric power being used by the traction motor can be redirected to the battery.

In such a method, the method may further include reducing an engine load and supplying a maximum power to the battery in response to the battery having insufficient capacity to store engine output immediately before the request to shift the transmission.

In such a method, the method may further include continuing to maintain operating conditions of the engine and redirecting the electric power back to the traction motor from the battery in response to the shift being executed.

Another example of a method may include operating a powertrain of a vehicle in a series mode and in response to a request to shift a gear of a transmission, controlling an engine of the vehicle to charge a battery by an amount that is a function of whether a driver demanded power is greater than a spare charging capacity of the battery or is less than the spare charging capacity.

In such a method, the amount may equal the spare charging capacity when the driver demanded power is greater than or equal to the spare charging capacity.

In such a method, the amount may equal the driver demanded power when the driver demanded power is less than the spare charging capacity.

In such a method, operating the powertrain in the series mode may include commanding open a driveline disconnect clutch positioned between a traction motor that is downstream of the driveline disconnect clutch and upstream of the transmission, and an integrated starter/generator that is upstream of the driveline disconnect clutch and downstream of the engine.

In such a method, the method may further include reducing an input torque to the transmission to within a threshold of 0 N-m for shifting the gear of the transmission.

In such a method, controlling the engine to charge the battery may include maintaining operating conditions of the engine when the driver demanded power is less than the spare charging capacity, and conversely includes adjusting operating conditions of the engine when the driver demanded power is greater than the spare charging capacity. The operating conditions may be one or more of an engine speed and an engine load.

In such a method, shifting the gear of the transmission may include controlling a transmission dog-clutch.

As discussed above with regard to method 300, the engine power command during a gear shift event while the powertrain is operating in series mode may be different depending on driver demanded power and the battery's spare charging capacity. Accordingly, FIGS. 4-5 depict two different timelines illustrating how engine power may be differentially controlled according to method 300 depicted at FIG. 3.

Turning now to FIG. 4, example timeline 400 is depicted, illustrating how engine operation is controlled during a gear shift event with the driveline operating in series mode, under circumstances where the battery is capable of accepting additional charging equal to an entirety of driver demanded power. Timeline 400 includes plot 405, indicating the engine power commanded and plot 408, indicating actual engine power, over time. Timeline 400 further includes plot 410, indicating the battery's maximum charging power limit, and plot 415, indicating the currently requested battery charging power, over time. Line 412 illustrates the battery's spare charging capacity. Plot 420 depicts an additional amount of battery charging power that is allocated to charging the battery due to the driver demanded power being less than the battery's spare charging capacity, and plot 425 depicts the total battery charging power that is a sum of the additional amount of battery charging power and the currently requested battery charging power, over time. Timeline 400 further includes plot 430, indicating driver demanded power, and plot 440, depicting power requested for supplying electricity to accessory load(s), over time. Plot 435 depicts power commanded to the traction motor (e.g. traction motor 282 at FIG. 2), over time. Timeline 400 further includes plot 445, indicating whether a transmission gear shift is requested, has been completed, or is not currently applicable (n/a), over time. Timeline 400 further includes plot 447, indicating whether the vehicle is operating in a series mode of operation (yes or no), over time.

With regard to example timeline 400, engine power (commanded and actual) increases in the direction of the arrow along the y-axis (see inset 450), battery charging increases in the direction of the arrow along the y-axis, and driver demanded power and accessory power increase in the direction of the arrow along the y-axis. Time increases in the direction of the arrows along the x-axis.

At time t0, the engine is in operation combusting air and fuel, and the actual engine power (plot 408) reflects the engine power command (plot 405). It may be understood that at time t0, the engine power command is a sum of the driver demanded power (plot 430), currently requested battery charging power (plot 415), and power requested from any accessory loads (plot 440). At time t0, the currently requested battery charging power (plot 415) is below the battery's maximum charging power limit (plot 410), and the difference between the battery's maximum charging power limit and the currently requested battery charging power is the battery's spare charging capacity (plot 412). At time t0 there is no request for a transmission gear shift (plot 445), and the powertrain is being operated in series mode (plot 447).

Between time t0 and t1, driver demanded power begins to increase (plot 430). The increase is reflected in the engine power command (plot 405), as the engine power command is a function of the driver demanded power. However, between time t0 and t1, the increased driver demanded power is not enough to induce a request for a gear shift from one gear (e.g. second gear) to another gear (e.g. third gear) (plot 445). Between time t0 and t1, the driver demanded power is being provided to the driven wheels (e.g. wheels 216 at FIG. 2) via the traction motor (e.g. traction motor 282 at FIG. 2), with the engine operating to provide electrical energy to the electric energy storage device (e.g. electrical energy storage device 275 at FIG. 2) via the ISG (e.g. ISG 240 at FIG. 2). Furthermore, between time t0 and t1, it may be understood that the total battery charging power (plot 425) is equivalent to the currently requested battery charging power (plot 415).

At time t1, a transmission gear shift is requested (plot 445). In other words, there is a request at time t1 to shift the transmission from one gear (e.g. second gear) to another gear (e.g. third gear). Because the powertrain is being operated in series mode, in order to execute the shift an input torque to the transmission (e.g. via input shaft 270 at FIG. 2) may have to be quite low (e.g. within a threshold torque of 0 N-m) before the appropriate clutch may be actuated (e.g. disengaged) to initiate the shift. To reduce the input torque to the transmission, the traction motor may be commanded to reduce its power output in a manner that enables the input shaft to rapidly reach the desired low torque for gear shift execution. As discussed above, because the driver demanded power is being provided via the traction motor, any reduction in traction motor output power may be temporarily reflected in the engine power command as a reduction in driver demanded power, which may cause the engine operation to undesirably fluctuate in a manner that decreases efficiency. Furthermore, an actual change in engine power in response to a temporary change in the engine power command may be slower than actual change in driver demanded power by the traction motor, and thus if the engine power command reflects the temporary change in driver demanded power, gear shift duration may be longer than if the engine power command did not reflect the temporary change in driver demanded power.

Accordingly, at time t1 the traction motor is commanded (plot 435) to reduce its power output to a level such that torque input to the transmission is within a threshold of 0 N-m. The controller assesses whether driver demanded power (plot 430) is less than the battery's spare charging capacity (line 412), and while not explicitly illustrated it may be understood that in this example timeline it is determined that the driver demanded power is less than the battery's spare charging capacity. Thus, the entirety of the driver demanded power is allocated to charging the battery. Plot 420 depicts the additional amount of charging power allocated to the battery that is equivalent to driver demanded power, and plot 425 depicts the total battery charging power that is the sum of the additional amount of charging power allocated to the battery (plot 420) and the currently requested battery charging power (plot 415). Between time t1 and t2, total battery charging power (plot 425) increases as a function of driver demanded power (plot 430), but remains below the battery's maximum power charging limit (plot 410). It may be understood that between time t1 and t2, the charging power provided to the battery equals the total charging power depicted by plot 425. Furthermore, between time t1 and t2, the engine power command (plot 405) is the sum of the total charging power (plot 425) and the power requested from accessory load(s) (plot 440).

At time t1 it may be understood that, with the traction motor power output reduced, input torque to the transmission is within the threshold of 0 N-m. Because the entirety of driver demanded power can be allocated to additional battery charging, the engine power command does not change and thus the gear shift is started at time t1, as the actual engine power (plot 408) is within the threshold (refer to decision block 355 at FIG. 3) of the engine power command (plot 405). At time t2, the gear shift is completed (plot 445). In other words, at time t2, the gear shift from one gear (e.g. second gear) to another gear (e.g. third gear) is completed, such that the desired gear corresponding to the gear shift request is engaged. With the gear shift having been executed at time t2, input torque to the transmission is increased via the commanding of the traction motor to produce torque output equivalent to the driver demanded power (see plot 435 in comparison with plot 430). Subsequent to time t2, battery charging power once again is the currently requested battery charging power (plot 415). Furthermore, after time t2, the engine power command once again is the sum of driver demanded power (plot 430), currently requested battery charging power (plot 415), and power requested from any accessory load(s) (plot 440).

Thus, the timeline of FIG. 4 depicts a situation where the powertrain is being operated in series mode where the traction battery is providing torque output to the transmission at a level based on driver demanded power, and where driver demanded power is less than the battery's spare charging capacity at a time when a gear shift is requested. By allocating the driver demanded power to additional battery charging, the engine power command does not reflect the temporary change in power demand stemming from the traction motor output power reduction, which may improve engine efficiency as compared to a situation where the engine power command reflects the temporary change in power demand. Furthermore, by allocating the driver demanded power to additional battery charging rather than temporarily changing the engine power command, the gear shift duration between time t1 and t2 may be shortened as compared to a situation where the driver demanded power were not allocated to additional battery charging.

Turning now to FIG. 5, depicted is an example timeline 500, illustrating how engine operation is controlled during a gear shift event with the driveline operating in series mode, under circumstances where the battery is not capable of accepting additional charging power corresponding to all the driver demanded power, but instead is capable of accepting additional charging power corresponding to a fraction of the driver demanded power. Timeline 500 includes plot 505, indicating the engine power commanded, and plot 510, indicating the actual engine power, over time. Timeline 500 further includes 515, indicating the battery's maximum charging power limit, and plot 520, indicating the currently requested battery charging power, over time. Line 518 illustrates the battery's spare charging capacity. Plot 525 depicts an additional amount of battery charging power that is allocated to charging the battery based on the driver demanded power and the battery's spare charging capacity, and plot 530 depicts the total battery charging power that is a sum of the additional amount of battery charging power and the currently requested battery charging power, over time. Timeline 500 further includes plot 535, indicating driver demanded power, and plot 540, indicating power requested for supplying electricity to accessory load(s), over time. Plot 543 depicts power output commanded to the traction motor (e.g. traction motor 282 at FIG. 2), over time. Timeline 500 further includes plot 545, indicating whether a transmission gear shift is requested, has been started, has been completed, or is not currently applicable (n/a), over time. Timeline 500 further includes plot 547, indicating whether the vehicle is operating in a series mode of operation (yes or no), over time.

With regard to example timeline 500, the engine power command increases in the direction of the arrow along the y-axis (see inset 550), battery charging increases in the direction of the arrow along the y-axis, and driver demanded power and accessory power increase in the direction of the arrow along the y-axis. Time increases in the direction of the arrows along the x-axis.

At time t0, it may be understood that the engine is combusting air and fuel, and the engine power command (plot 505) is a sum of driver demanded power (plot 535), currently requested battery charging power (plot 520), and any amount of power requested for powering accessory load(s) (plot 540). At time t0, the powertrain is being operated in the series mode, such that engine operation provides a source of electricity to the electric energy storage device (e.g. electric energy storage device 275 at FIG. 2) via the ISG (e.g. ISG 240 at FIG. 2) for powering the traction motor (e.g. traction motor 282 at FIG. 2). At time t0, driver demanded power is such that a gear shift is not requested (plot 545).

Between time t0 and t1, driver demanded power (plot 535) begins to increase, and the increase in driver demanded power is reflected in the engine power command (plot 505). At time t1, a transmission gear shift is requested (plot 545). For example, the request may be a request to shift transmission gearing from one gear (e.g. third gear) to another gear (e.g. fourth gear). The request may be received at a controller (e.g. vehicle system controller 255 at FIG. 2) of the vehicle.

With the request having been received at time t1, the controller determines the battery's spare charging capacity (line 518). The battery's spare charging capacity, as discussed above, is the difference between the battery's maximum charging power limit (plot 515) and the currently requested battery charging power (plot 520). Furthermore, the controller determines whether the driver demanded power (plot 535) is less than the battery's spare charging capacity. While not explicitly illustrated, in this example timeline 500 it may be understood that the controller determines that the driver demanded power is greater than the battery's spare charging capacity. Thus, in contrast to the situation depicted at FIG. 4, all of the driver demanded power may not be allocated to additional charging, because doing so would require battery charging power greater than the maximum charging power limit. Instead, the driver demanded power equaling the battery's spare charging capacity may be allocated to the additional charging of the battery. In other words, just a portion of the driver demanded power may be allocated to charging the battery, and the portion is equivalent to the battery's spare charging capacity.

Accordingly, at time t1, responsive to the gear shift request and responsive to the determination that the driver demanded power is greater than the battery's spare charging capacity, total battery charging power (plot 530) is commanded to equal the maximum charging power limit (plot 515). Plot 525 depicts the additional amount of battery charging power that is allocated to charging the battery, which is simply equivalent to the battery's spare charging capacity. A sum of the currently requested battery charging power (plot 520) and the additional amount of battery charging power (plot 525) equals the maximum charging power limit (plot 515).

Because an entirety of the driver demanded power is greater than the battery's spare charging capacity, the engine power command changes. Specifically, the engine power command decreases by a difference between the driver demanded power and the battery's spare charging capacity. Said another way, the engine power command becomes the sum of total battery charging power (plot 530) and any power being requested to power accessory load(s) (plot 540). Thus, as can be seen at plot 505, the engine power command drops to a lower value, but it may be understood that the engine power command would have been modified much more significantly (equivalent to an entirety of the driver demanded power) if the portion of driver demanded power were not allocated to charging the battery.

As mentioned above, there is a time lag between an engine power command being issued, and actual engine power reaching the engine power command. Thus, between time t1 and t2, the actual engine power (plot 510) decreases at a slower rate than the engine power command (plot 505). In order to control actual engine power to the engine power commanded, engine torque actuator(s) (e.g. engine torque actuators 96 at FIG. 2) may be used. For example an intake throttle may be commanded to a more closed position in some examples. Additionally or alternatively, a timing and/or quantity of fuel provided to the engine may be decreased. Additionally or alternatively, spark timing may be modified so as to reduce engine power output.

At time t2, actual engine power (plot 510) is within the threshold of the commanded engine power (plot 505). Accordingly, the gear shift process is initiated, which includes commanding the traction motor to reduce its power output to a point where input torque to the transmission to a level within a threshold of 0 N-m, depicted by plot 543. Between time t2 and t3, the gear shift process is carried out, such that the transmission disengages one gear and engages another gear. For example, the gear shift may include shifting the transmission from third gear to fourth gear.

At time t3, the gear shift event has been completed (plot 545). With the gear shift having been carried out, the traction motor (see plot 543) is again commanded to produce output power equivalent to the driver demanded power. The engine power command (plot 505) at time t3 thus once again becomes the sum of driver demanded power (plot 535), currently requested battery charging power (plot 520), and any power requested for powering accessory load(s) (plot 540). After time t3, with the engine power command having been set, engine torque actuators are commanded to increase the engine power output in order to produce power output equal to the commanded power. For example, the intake throttle may be opened to a greater extent, a quantity or rate at which fuel is provided to the engine may be increased, spark timing may be modified, etc., in order to increase engine power output to the commanded engine power output. Shortly after time t3, the actual engine power output becomes within the threshold of the engine power command.

Thus, the timeline of FIG. 5 depicts a scenario where the vehicle powertrain is being operated in series mode, and at the time of the gear shift request, an amount of spare charging capacity of the battery is less than driver demanded power. Thus, the amount of additional charging is set as equal to the spare charging capacity of the battery, and the difference between driver demanded power and the spare charging capacity of the battery is reflected in the engine power command. In other words, instead of the engine power command being reduced by an amount equivalent to the driver demanded power at the time of the gear shift, the engine power command is reduced by an amount equivalent to the difference between driver demanded power and the spare charging capacity of the battery. If the additional amount of charging power were not allocated to the battery, the engine power command would be expected to change by a greater amount (equivalent to the driver demanded power), which may decrease engine efficiency. Furthermore, if the additional amount of charging power were not allocated to the battery, the gear shift duration may be extended as it may take a longer period of time for actual engine power to reach the engine power command for starting the gear shift.

As depicted with regard to FIG. 5, there is a slight delay between the gear shift request at time t1 and the gear shift start at time t2, to allow the actual engine power to equal (or be within a threshold of) the engine power command. In an alternative example the delay may be avoided or significantly reduced by relying on the vehicle system controller (e.g. VSC 255 at FIG. 2) to proactively constrain engine charging. For example, as the vehicle approaches a shift point, the engine power command may be reduced to the maximum battery charging power limit. With this modification to the above-mentioned methodology, the actual engine power may equal the battery charging power limit at the shift point, thus reducing or avoiding the time it takes to match the engine power with the commanded engine power following the gear shift request.

Thus, turning to FIG. 6, an example timeline 600 is shown depicting a situation where the slight delay between the gear shift request and the gear shift start is avoided or reduced by reducing the engine power command immediately prior to (within a threshold duration such as 10 seconds, 5 seconds, 1 second, less than 1 second, etc.) a shift request, under conditions where it is inferred that driver demand power is greater than or equal to the battery's spare charging capacity.

Timeline 600 includes plot 605, indicating the engine power commanded, and plot 610, indicating the actual engine power, over time. Timeline 600 further includes 615, indicating the battery's maximum charging power limit, and plot 620, indicating the currently requested battery charging power, over time. Line 618 illustrates the battery's spare charging capacity. Plot 625 depicts an additional amount of battery charging power that is allocated to charging the battery based on the driver demanded power and the battery's spare charging capacity, and plot 630 depicts the total battery charging power that is a sum of the additional amount of battery charging power and the currently requested battery charging power, over time. Timeline 600 further includes plot 635, indicating driver demanded power, and plot 640, indicating power requested for supplying electricity to accessory load(s), over time. Plot 643 depicts power output commanded to the traction motor (e.g. traction motor 282 at FIG. 2), over time. Timeline 600 further includes plot 645, indicating whether a transmission gear shift is requested/started, has been completed, or is not currently applicable (n/a), over time. It may be understood, as will be elaborated in further detail below, that for this example timeline 600 the gear shift start coincides with the gear shift request. In other words, because engine power output is controlled prior to the request to shift the transmission gear, actual engine power is within the threshold of the engine power commanded at the time of the request, thus enabling the avoidance or reduction of delay between the gear shift request and the gear shift start (which alternatively is not avoided via the control strategy depicted at the timeline of FIG. 5). Timeline 600 further includes plot 647, indicating whether the vehicle is operating in a series mode of operation (yes or no), and plot 648, indicating whether the vehicle system controller infers an upcoming shift (yes or no) over time.

With regard to example timeline 600, the engine power command increases in the direction of the arrow along the y-axis (see inset 650), battery charging increases in the direction of the arrow along the y-axis, and driver demanded power and accessory power increase in the direction of the arrow along the y-axis. Time increases in the direction of the arrows along the x-axis.

At time t0, it may be understood that the engine is combusting air and fuel, and the engine power command (plot 605) is a sum of driver demanded power (plot 635), currently requested battery charging power (plot 620), and any amount of power requested for powering accessory load(s) (plot 640). At time t0, the powertrain is being operated in the series mode, such that engine operation provides a source of electricity to the electric energy storage device (e.g. electric energy storage device 275 at FIG. 2) via the ISG (e.g. ISG 240 at FIG. 2) for powering the traction motor (e.g. traction motor 282 at FIG. 2). At time t0, driver demanded power is such that a gear shift is not requested (plot 545).

Between time t0 and t1, driver demanded power (plot 635) begins to increase, and the increase in driver demanded power is reflected in the engine power command (plot 605). At time t1, the vehicle system controller (e.g. VSC 255 at FIG. 2) infers that an upcoming shift will be requested within a predetermined duration of time (plot 648). In some examples, the predetermined duration of time may be variable, depending on operating conditions including but not limited to engine speed, engine load, the battery's spare charging capacity, the current engine power commanded to the engine, driver demanded power, etc. For example, if driver demanded power is inferred to be greater than the battery's spare charging capacity, then the engine power command may be set to charge the battery by an additional amount corresponding to the battery's spare charging capacity as discussed above, which may result in the engine having to be controlled to the engine power command, which reflects the additional amount of charging provided to the battery. However, controlling actual engine power output to the commanded engine power may take a variable amount of time depending on a difference between driver demanded power and the battery's spare charging capacity. Accordingly, the predetermined duration of time between inferring the upcoming shift and the shift being requested may vary. In other words, the vehicle system controller may infer an upcoming shift earlier under conditions where actual engine power has to be changed by a greater amount to match the engine power command, as compared to conditions where actual engine power has to be changed by a lesser amount to match the engine power command.

The upcoming shift may be inferred based on one or more of engine speed and engine load, current transmission gear engaged, traction motor power output to the transmission, ISG output, throttle position, inferred upcoming acceleration request, etc. Thus, an upcoming shift may be inferred based on inferred driver demand a few seconds in the future. As one example scenario, the vehicle may be operating in an adaptive cruise control (e.g. set at a target cruise speed) where current vehicle speed is low (e.g. lower than the target cruise speed) due to a presence of another vehicle ahead of the vehicle. In response to the other vehicle in front of the vehicle changing lanes (resulting in a clear road ahead), driver demand for the next few seconds may be inferred based on the target cruise speed. Based on the difference between the current vehicle speed and the target cruise speed, all gear shifts needed to enable the vehicle to reach the target speed may too be inferred. It may be understood that the above example is meant to be representative and other methodologies for inferring driver demand are within the scope of this disclosure.

In some examples an upcoming shift may be based on learned driving behavior, and may be in some examples be based on a learned route that the vehicle is traveling along.

With the upcoming shift inferred at time t1, the controller determines the battery's spare charging capacity (line 618), along with the driver demanded power (plot 635). While not explicitly illustrated, in this example timeline it may be understood that the driver demanded power is greater than the battery's spare charging capacity. Accordingly, at time t1, total battery charging power (plot 630) is commanded to equal the maximum charging power limit (plot 615). Plot 625 depicts the additional amount of battery charging power that is allocated to charging the battery, which is simply equivalent to the battery's spare charging capacity. A sum of the currently requested battery charging power (plot 620) and the additional amount of battery charging power (plot 625) equals the maximum charging power limit (plot 615).

Because the driver demanded power is greater than the battery's spare charging capacity, the engine power command is adjusted. Specifically, the engine power command decreases by a difference between the driver demanded power and the battery's spare charging capacity. Said another way, the engine power command becomes the sum of total battery charging power (plot 630) and any power being requested to power accessory load(s) (plot 640). Thus, as can be seen at plot 605, the engine power command drops to a lower value.

With the engine power command having changed at time t1, between time t1 and t2 actual engine power is controlled to substantially match the engine power command. As mentioned above, engine torque actuators may be used to control actual engine power to within the threshold of the engine power command. Between the time between t1 and t2, which corresponds to the time duration between the upcoming shift being inferred and the upcoming shift being requested, actual engine power is controlled to within the threshold of the engine power command.

At time t2, a transmission gear shift is requested (plot 645). For example, the request may be a request to shift transmission gearing from one gear (e.g. third gear) to another gear (e.g. fourth gear). The request may be received at a controller (e.g. vehicle system controller 255 at FIG. 2) of the vehicle.

Because at time t2, actual engine power (plot 610) is already within the threshold of the commanded engine power (plot 605), the gear shift process is initiated without having to wait for the actual engine power to reach the engine power commanded. Specifically, the gear shift process is initiated at time t2 by commanding the traction motor to reduce its power output to a point where input torque to the transmission to a level within a threshold of 0 N-m, depicted by plot 643. Between time t2 and t3, the gear shift process is carried out, such that the transmission disengages one gear and engages another gear. For example, the gear shift may include shifting the transmission from third gear to fourth gear.

At time t3, the gear shift event has been completed (plot 645). With the gear shift having been carried out, the traction motor (see plot 643) is again commanded to produce output power equivalent to the driver demanded power. The engine power command (plot 605) at time t3 thus once again becomes the sum of driver demanded power (plot 635), currently requested battery charging power (plot 620), and any power requested for powering accessory load(s) (plot 640). After time t3, with the engine power command having been set, engine torque actuators are commanded to increase the engine power output in order to produce power output equal to the commanded power. For example, the intake throttle may be opened to a greater extent, a quantity or rate at which fuel is provided to the engine may be increased, spark timing may be modified, etc., in order to increase engine power output to the commanded engine power output. Shortly after time t3, the actual engine power output becomes within the threshold of the engine power command.

In this way, engine efficiency may be improved and time duration corresponding to a gear shift event may be reduced for vehicles operating in a series mode of operation where the drivetrain includes a disconnect clutch positioned between an ISG and a traction motor, the traction motor downstream of the ISG and upstream of an automatic transmission, the ISG downstream of an engine. The transmission may be a dog-clutch transmission.

The technical effect of allocating all or a portion of driver demanded power to additional battery charging is to reduce or avoid changes in engine operation for gear shifts when the vehicle is operating in series mode. Reducing or avoiding changes in engine operation may improve engine efficiency and may reduce a gear shift duration. Improving engine efficiency may improve engine lifetime, reduce issues related to release of undesired evaporative emissions to the atmosphere, and improve customer satisfaction. Reducing a time duration for shifting may lead to improved transmission shift quality, which may increase transmission lifetime and further improve customer satisfaction.

Thus, the systems discussed herein, along with the methods discussed herein, may enable one or more systems and one or more methods. In one example, a driveline operating method comprises maintaining operating conditions of an engine and redirecting electric power generated via the engine from a traction motor to a battery in response to a request to shift a transmission when the driveline is operating in a series mode. In a first example of the method, the method further includes wherein the operating conditions are an engine speed and an engine load. A second example of the method optionally includes the first example, and further includes wherein the transmission is positioned in the driveline downstream of the traction motor. A third example of the method optionally includes any one or more or each of the first through second examples, and further includes wherein the request to shift the transmission includes a request to shift the transmission from a lower gear to a higher gear. A fourth example of the method optionally includes any one or more or each of the first through third examples, and further includes wherein shifting the transmission includes controlling an open and a closed state of a transmission dog clutch. A fifth example of the method optionally includes any one or more or each of the first through fourth examples, and further comprises maintaining operating conditions in response to inferring that an entirety of the electric power being used by the traction motor can be redirected to the battery. A sixth example of the method optionally includes any one or more or each of the first through fifth examples, and further comprises reducing an engine load and supplying a maximum power to the battery in response to the battery having insufficient capacity to store engine output immediately before the request to shift the transmission. A seventh example of the method optionally includes any one or more or each of the first through sixth examples, and further comprises continuing to maintain operating conditions of the engine and redirecting the electric power back to the traction motor from the battery in response to the shift being executed.

Another example of a method comprises operating a powertrain of a vehicle in a series mode and in response to a request to shift a gear of a transmission, controlling an engine of the vehicle to charge a battery by an amount that is a function of whether a driver demanded power is greater than a spare charging capacity of the battery or is less than the spare charging capacity. In a first example of the method, the method further includes wherein the amount equals the spare charging capacity when the driver demanded power is greater than or equal to the spare charging capacity. A second example of the method optionally includes the first example, and further includes wherein the amount equals the driver demanded power when the driver demanded power is less than the spare charging capacity. A third example of the method optionally includes any one or more or each of the first through second examples, and further includes wherein operating the powertrain in the series mode includes commanding open a driveline disconnect clutch positioned between a traction motor that is downstream of the driveline disconnect clutch and upstream of the transmission, and an integrated starter/generator that is upstream of the driveline disconnect clutch and downstream of the engine. A fourth example of the method optionally includes any one or more or each of the first through third examples, and further comprises reducing an input torque to the transmission to within a threshold of 0 N-m for shifting the gear of the transmission. A fifth example of the method optionally includes any one or more or each of the first through fourth examples, and further includes wherein controlling the engine to charge the battery includes maintaining operating conditions of the engine when the driver demanded power is less than the spare charging capacity, and conversely includes adjusting operating conditions of the engine when the driver demanded power is greater than the spare charging capacity. A sixth example of the method optionally includes any one or more or each of the first through fifth examples, and further includes wherein the operating conditions are one or more of an engine speed and an engine load. A seventh example of the method optionally includes any one or more or each of the first through sixth examples, and further includes wherein shifting the gear of the transmission includes controlling a transmission dog-clutch.

An example of a system for a hybrid electric vehicle comprises a driveline disconnect clutch positioned between an integrated starter/generator and a traction motor, the traction motor downstream of the integrated starter/generator and upstream of a transmission; an engine positioned upstream of the integrated starter/generator; an electrical energy storage device; and a controller with computer readable instructions stored on non-transitory memory that, when executed, cause the controller to: in response to a request to shift the transmission under conditions where the driveline disconnect clutch is fully open and where the traction motor is providing a driver demanded power to driven wheels of the vehicle via electric power generated by the engine, determine a storage capacity of the electrical energy storage device; and maintain an engine power output and transfer an electric power equivalent to the driver demanded power from the traction motor to charging the electrical energy storage device under conditions where the driver demanded power is less than the storage capacity of the electrical energy storage device. In a first example of the system, the system further includes wherein the controller stores further instructions to adjust the engine power output to charge the electrical energy storage device to a maximum charging power limit of the electrical energy storage device under conditions where the driver demanded power is greater than the storage capacity of the electrical energy storage device. A second example of the system optionally includes the first example, and further includes wherein the controller stores further instructions to adjust the engine power output immediately prior to the request to shift the transmission. A third example of the system optionally includes any one or more or each of the first through second examples, and further includes wherein the transmission includes a dog-clutch for controlling shifting of the transmission; and wherein the controller stores further instructions to control an open state and a closed state of the dog-clutch for executing the request to shift the transmission.

In another representation, a method comprises, with a vehicle powertrain in series mode, inferring an upcoming transmission shift request, commanding an engine power output to charge a battery to its maximum charging capacity, and adjust an actual engine power output to within a threshold of the upcoming shift request prior to the upcoming shift request being received.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   operating a powertrain of a vehicle in a series mode and in response to a request to shift a gear of a transmission, controlling an engine of the vehicle to charge a battery by an amount that is a function of whether a driver demanded power is greater than a spare charging capacity of the battery or is less than the spare charging capacity, wherein the amount equals the driver demanded power when the driver demanded power is less than the spare charging capacity.

2. The method of claim 1, wherein the amount equals the spare charging capacity when the driver demanded power is greater than or equal to the spare charging capacity.

3. The method of claim 1, wherein operating the powertrain in the series mode includes commanding open a driveline disconnect clutch positioned between a traction motor that is downstream of the driveline disconnect clutch and upstream of the transmission, and an integrated starter/generator that is upstream of the driveline disconnect clutch and downstream of the engine.

4. The method of claim 1, further comprising reducing an input torque to the transmission to within a threshold of 0 N-m for shifting the gear of the transmission.

5. A method comprising:
   operating a powertrain of a vehicle in a series mode and in response to a request to shift a gear of a transmission, controlling an engine of the vehicle to charge a battery by an amount that is a function of whether a driver demanded power is greater than a spare charging capacity of the battery or is less than the spare charging capacity, wherein controlling the engine to charge the battery includes maintaining operating conditions of the engine when the driver demanded power is less than the spare charging capacity, and conversely includes adjusting operating conditions of the engine when the driver demanded power is greater than the spare charging capacity.

6. The method of claim 5, wherein the operating conditions are one or more of an engine speed and an engine load.

7. The method of claim 1, wherein shifting the gear of the transmission includes controlling a transmission dog-clutch.

8. The method of claim 5, wherein shifting the gear of the transmission includes controlling a transmission dog-clutch.

* * * * *